Feb. 12, 1935.         C. J. SCHLUTER         1,991,297
LOADING AND UNLOADING TRUCK
Filed Oct. 19, 1933         4 Sheets-Sheet 1
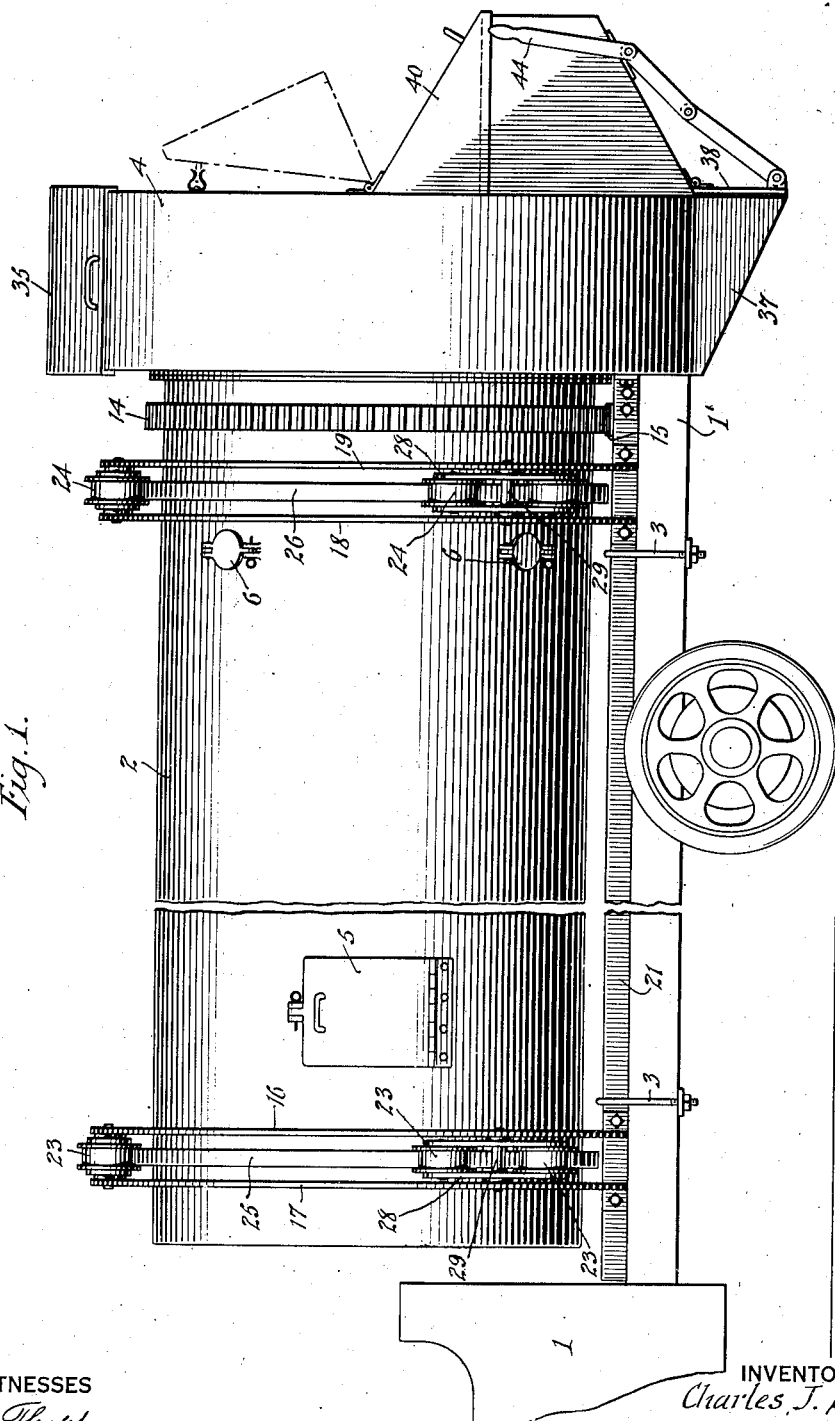
WITNESSES
Edw. Thorpe
A. L. Kitchin
INVENTORS
Charles J. Schluter
BY
Munn, Anderson, Stanley, Foster & Liddy.
ATTORNEY

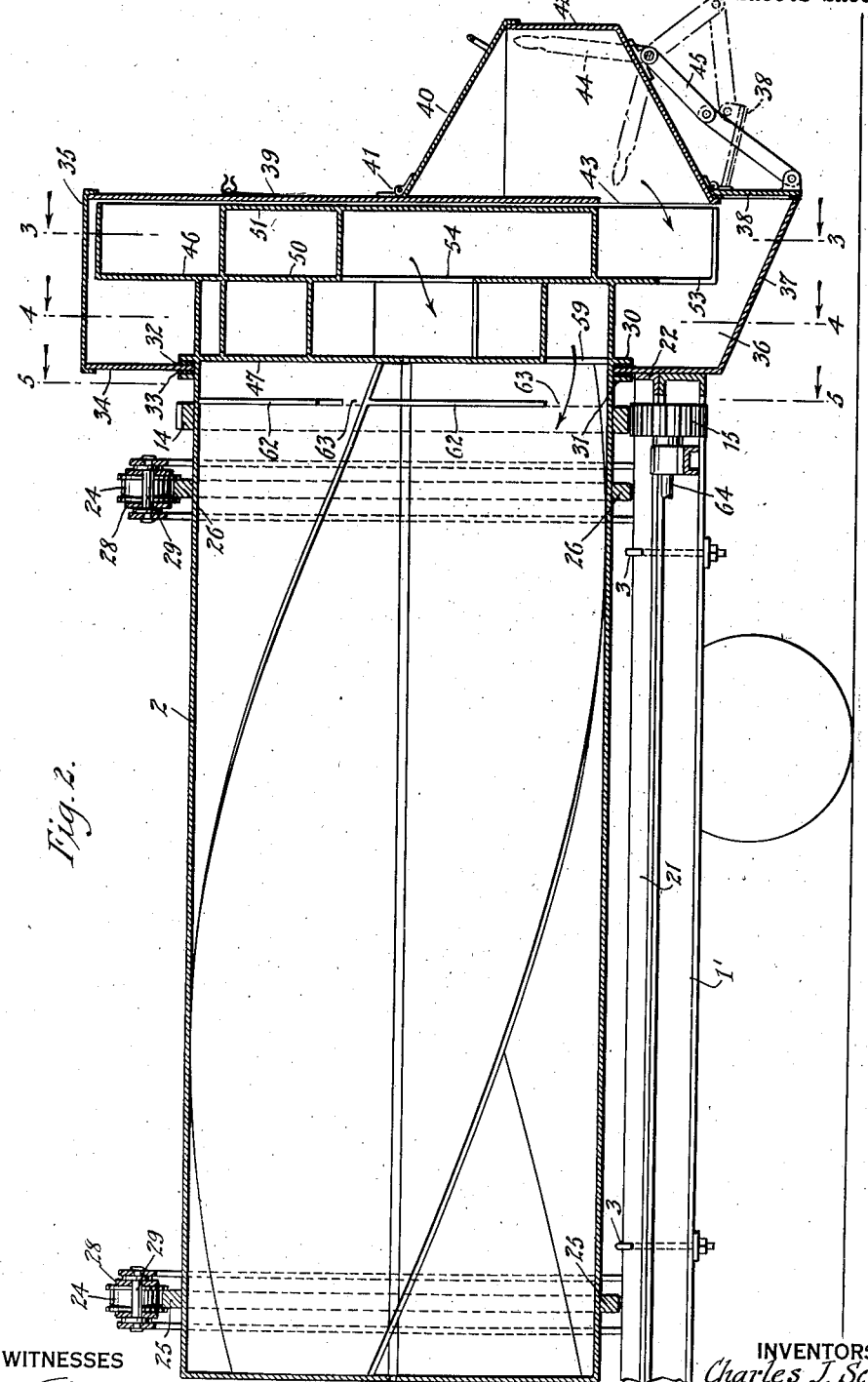

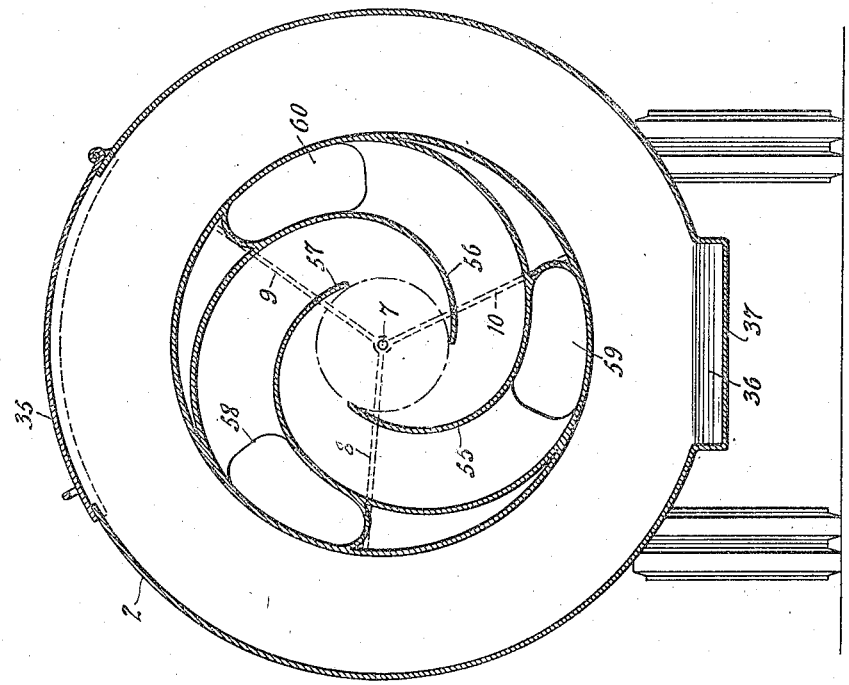
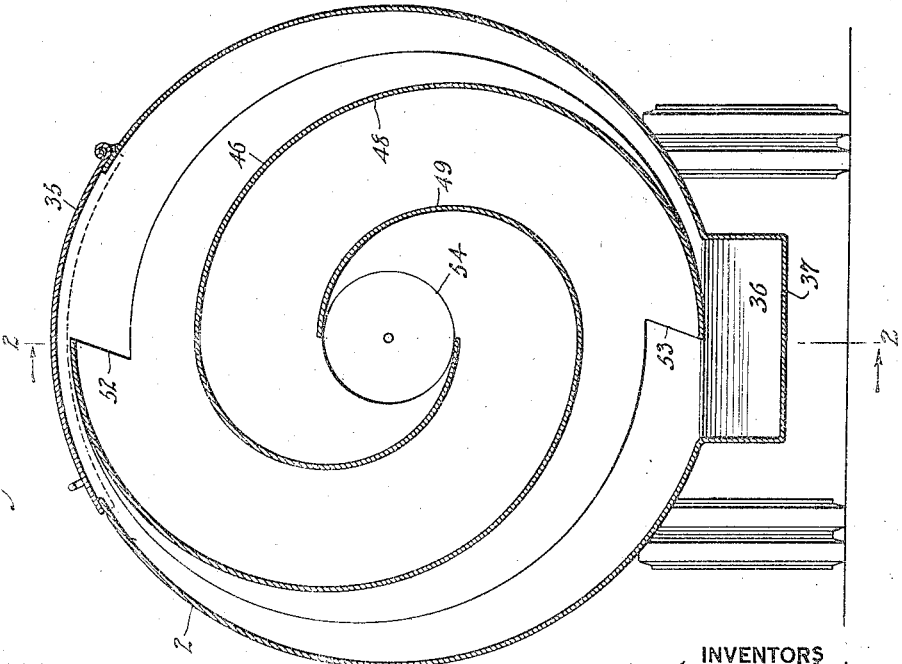

Feb. 12, 1935. C. J. SCHLUTER 1,991,297
LOADING AND UNLOADING TRUCK
Filed Oct. 19, 1933 4 Sheets-Sheet 4
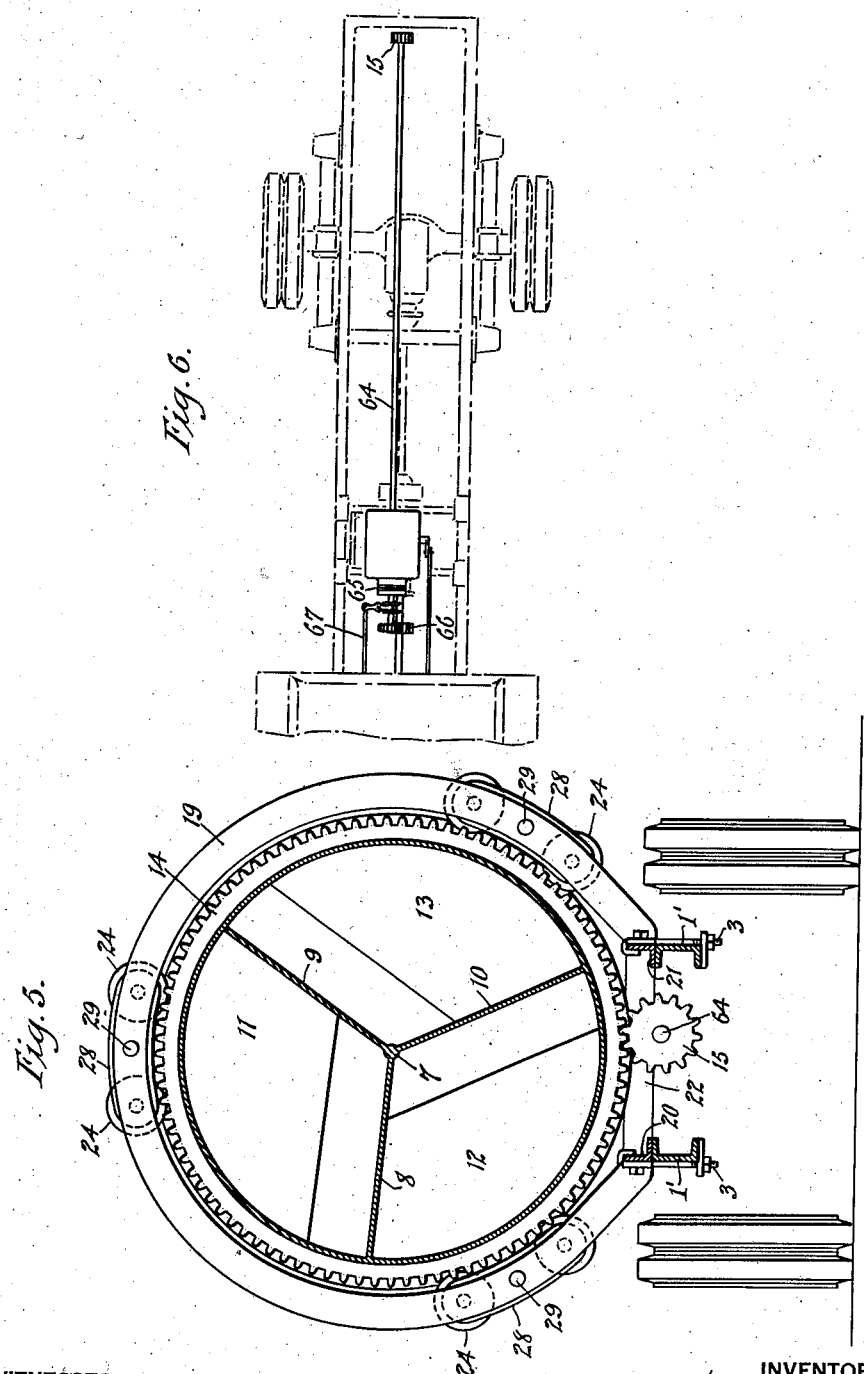

Patented Feb. 12, 1935

1,991,297

UNITED STATES PATENT OFFICE 1,991,297

LOADING AND UNLOADING TRUCK

Charles J. Schluter, Flushing, N. Y.

Application October 19, 1933, Serial No. 694,298

6 Claims. (Cl. 214—67)

This invention relates to an improved loading and unloading device for motor trucks, the object of the invention being to provide an improved construction which may be bodily connected to a truck and may be removed at any time, the structure being such that the moving parts are actuated by the power plant of the truck.

Another object of the present invention is to provide an improved construction adapted to be applied to different kinds of trucks, the structure being so formed as to present a container and loading elements operated from suitable driving mechanism.

A further object of the invention is to provide a loading and unloading structure for truck bodies wherein the parts are so formed that when moved in one direction they will produce a loading action, and when moved in the opposite direction will produce an unloading action.

An additional object is to provide a truck unit adapted to be placed on a truck chassis either as a permanent fixture or as a disengageable fixture, the parts being so formed that there is presented a container for receiving the matter being loaded, and rotating means for loading and unloading the container.

In the accompanying drawings—

Figure 1 is a side view of the rear part of a truck with a device embodying the invention applied thereto;

Figure 2 is a longitudinal vertical sectional view through the structure shown in Figure 1, the front part of the truck being omitted;

Figure 3 is a sectional view through Figure 2, on the line 3—3, the truck being shown in diagram;

Figure 4 is a sectional view through Figure 2 on the line 4—4, the truck being shown in diagram;

Figure 5 is a sectional view through Figure 2 on the line 5—5, the truck being shown in diagram;

Figure 6 is a top plan view of the chassis and certain other parts of the truck shown in Figure 2, together with means for connecting the loading and unloading unit with the power plant of the truck.

Referring to the accompanying drawings by numerals, 1 indicates a truck of any desired kind on which a container 2 is mounted, said container being clamped in place by suitable hook bolts 3. Connected to the container 1 is a loading and unloading structure 4 which is adapted to function while the truck is moving along or while it is standing still, as desired. The container or tank 1 is cylindrical and closed at one end, while the other end opens into the loading and unloading structure 4. One or more manholes, doors or the like 5 may be provided in tank 1, and in addition preferably a small manhole 6 at spaced intervals around the tank 1 near the inlet end. As shown particularly in Figure 5 there is a propeller or feeding structure 7 arranged within tank 1, said propeller or feeding structure having feeding blades 8, 9 and 10, these blades forming the compartments 11, 12 and 13. Preferably there is provided a small examining manhole 6 for each of these compartments so that the interior of the tank may be inspected at any time to see whether or not the same has been loaded to one hundred percent capacity. In order that the blades 8, 9 and 10 may function properly they are welded or otherwise secured at their outer edges to tank 1.

Tank 1 is caused to rotate through the action of the gear wheel 14 rigidly secured thereto and continually meshing with the driving gear 15. In order that the parts may rotate freely and yet be properly retained in place on the truck, there are provided supporting webs 16 and 17 near the front, and 18 and 19 near the rear, said webs being bolted, riveted or otherwise rigidly secured to angle bars 20 and 21 forming part of the supporting frame.

There are provided end bars 22 connected to these side angle bars at each end whereby the complete frame is provided which rests on the chassis 1' of the truck 1. The bolts 3 act to clamp the parts together as shown particularly in Figures 1 and 5. The supporting webs are really metallic rings positioned so that they will be spaced slightly from the tank 1 so that the various flanged rollers 23 and 24 carried thereby may coact with the tracks 25 and 26 rigidly secured to the tank 1. These rollers are preferably arranged in pairs and spaced apart as shown in Figure 5. Preferably each pair of rollers is provided with one or more connecting links 28 as shown in Figure 5, this connecting link being pivoted at 29 on the supporting shrouds. This will allow the rollers to swing around the pin 29 so as to take care of any unevenness or irregularities in the respective tracks 25 and 26. As in other filling devices, when it is desired that material such as ashes, garbage and the like be loaded onto tank 1, the parts are rotated in one direction with the rollers acting as anti-friction supporting means. To discharge the contents of the container the reverse rotation is all that is necessary.

As shown in Figure 2, the tank 1 is provided with a pair of flanges 30 and 31 having suitable washers 32 and 33, said washers being felt or other desirable material. This is to provide a reasonably tight slip connection between the rotating tank and the stationary housing 34, which housing has a lid 35 at the highest point and a depending discharge section 36 at the lowest point, said discharge section having an inclined bottom 37 whereby when the door 38 is opened the matter in section 36 may slide out by the action of gravity. It will be understood that the casing 34 is provided with a front panel 39 which does not rotate and onto which the lid 40 is hingedly connected at 41. Also the hopper 42 is carried by the casing 34 and has a charge opening 43 which discharges toward or into the charge section 46. When loading the device workmen dump the various matter to be loaded into the hopper 42, the lid 40 being raised. When the matter is being discharged the lid 40 is usually left closed and the door 38 opened by manipulating the lever 44 which is connected to suitable actuating links 45 associated with the door 38. The casing 34 is welded, riveted or otherwise rigidly secured to one end of the plates or angle irons 21 and 22.

Arranged within the housing 34 are a pair of spirally constructed loading and unloading members, namely, the members 47 and 46. These members may be built up of a number of pieces welded or otherwise rigidly secured together, and when secured together both members will function as a unit and rotate at the same speed and in the same direction as tank 1. The feeding member or volute 46 is provided with spiral webs 48 and 49 which have side panels 50 and 51 whereby they present closed channels except at their open ends 52 and 53. Panel 50 is open at 54 which is the center of the structure 46, whereby material scooped up as illustrated in Figure 3 will be carried around the spiral webs 48 and 49 until it comes to the opening 54, at which point the material will be caused to move through this opening by reason of the pressure of gravity. As it falls through the opening 54 it is gathered up by the spiral webs 55, 56 and 57 of member 47, as illustrated in Figure 4. These spiral members act to move the material downwardly and radially until the material is discharged through one of the openings 58, 59 and 60. These various openings 58 to 60 are arranged opposite the respective chambers 11, 12 and 13 (Fig. 5), so that the material discharged through these openings will enter the respective chambers and through the action of gravity and the blades 8, 9 and 10 will be gradually fed towards the closed end 61 of tank 1. These blades are arranged 120° apart and are formed spirally and continuous from one end of the tank to the other so that as the device operates the material will be gradually carried towards the closed end 61. Near the rear end are arranged partition members 62, each partition having an opening 63 for the entrance of the material being discharged into tank 1. It will be understood that there is a partition member 62 for each of the compartments 11, 12 and 13. These partition members act to prevent undue clogging of the material near the entrance and discharge ends of the device.

The spiral, or rather convolute structure, shown in Figures 3 and 4 presents means which will pick up ashes, garbage and other material to be transported and raise the same so that the material will be discharged through the opening 54 into the center of the structure shown in Figure 4, which will gradually carry the material downwardly and through the openings 58 to 60, and from there to the various openings 63 into the tank, where the blades 8, 9 and 10 will carry the material towards the closed end.

This action continues until the tank is filled completely, or rather up to the partition member 62. If additional matter were attempted to be forced into the tank none of the parts will be injured but the members 46 and 47 as shown in Figures 2, 3 and 4, will merely rotate while filled with material, but otherwise will perform no function.

When it is desired to discharge the contents of the tank when the same has been completely or partly filled, the door 38 is opened and the tank is rotated in a reverse direction, namely, so that the webs 8, 9 and 10 will gradually force the material through the opening 63 and the various openings 58 to 60, inclusive. As the material is carried through these openings the webs 55 to 57, inclusive, will act to carry the material readily inwardly until it is discharged out through the opening 54 and through the spiral passageways produced by the webs 48 and 49, which will then act upon the material and cause the same to be discharged out through the openings 52 and 53. The material discharged out these openings will drop by gravity against the bottom 37, as shown in Figure 2, and will then move under the action of gravity out of the device. It will thus be seen that the members 46 and 47 when rotating in one direction act as loading means or a loading structure, and when rotating in the other direction will act as an unloading or discharge structure.

If the parts should at any time become clogged, or if it should be desired for any reason to examine the members 46 and 47, the lid or cover 35 may be swung back and the parts examined without trouble. This lid is provided with flanges as shown in Figure 2, so that there will be a tight fit. In fact, the door 38 and door 40 are fitted snugly in place so that the entire device will be sanitary and unobjectionable. With many garbage collecting trucks now in use, the smell is extremely distasteful as these trucks perform their usual functions. In the present invention there is no objectionable smell as all the parts are tightly closed including the arrangement of the washers 32 and 33. The only time any smell can escape is when the door 40 is open for the reception of new garbage.

The device is so formed that it may be bolted or clamped to different forms of trucks. Preferably it is bolted or clamped to a truck which has a power plant, namely, a motor truck of any well known type. When this is the case the power for rotating the various parts is taken off the driving mechanism of the truck. While the power take-off may vary widely one embodiment is shown in Figure 6. It is desired to be understood, however, that the power take-off is connected with the engine in such a way that the tank 1 and associated parts may be actuated whether the truck is moving or standing still, provided the engine is functioning. As shown in Figure 6 there is provided a shaft 64 which has the gear wheel 15 rigidly secured thereto whereby whenever shaft 64 rotates, the drum or tank 1 will rotate. Shaft 64 extends forwardly and is connected through a clutch 65 and gearing 66 with the drive shaft from the engine. A manually controlled structure 67 is connected with the clutch 65 so that the same may be thrown into and out of operation at any time without disturbing the action of the truck.

In operation when it is desired to use the device it is arranged as shown in Figures 1 and 2. The truck is driven to the desired place where the material to be loaded is located. This material is discharged into the hopper 42 and falls by gravity into section 36, filling the same so that the webs 48 and 49 may scoop up some of this material as they pass. From time to time new material is dumped into the hopper 42 and is acted upon in the same manner. The material which has been scooped up by the webs 48 and 49 is discharged into tank 1 and remains there until the tank and its associated parts have been reversed. If the material is discharged in a continuous stream into the hopper 42, the tank is continuously rotated, but if the charge is intermittent as, for instance, during the collection of garbage, the rotation of tank 1 and associated parts may be intermittent. As the truck moves along the streets to collect garbage or other material it gradually becomes filled. When the operator believes the tank is filled, or when the loading and unloading structure is not functioning properly, he may open and look through the handholes 6 to see whether or not the tank has been filled to capacity. If this is true then he will stop the rotation of the tank and also stop dumping additional material into hopper 42. The truck may then be driven to a dump or other desired point and the door 38 opened. The tank 1 and associated parts are then rotated in the reverse direction for the desired time, or until the tank has been completely emptied.

Where the device is used for the transportation of garbage and it is desired to clean out the tank, nozzles directing water may be used, said nozzles discharging through the various inspection handholes or through the large manhole 5. In this way the tank may be kept clean and also the loading and unloading structures 46 and 47 readily kept clean. Where sand or similar material is being transported it will not be necessary to clean the tank as the sand will readily fall into the tank and again be readily discharged therefrom without leaving any residue.

While the device has been described as being removably mounted on a truck, it can be manufactured as an integral part thereof, though ordinarily it is made substantially as shown so that trucks now in common use may be converted into collecting trucks for garbage or other material.

I claim:

1. A device of the character described including a container and means at one end of the container acting in the double capacity of loading and unloading the container, said means including a pair of groups of spirally arranged webs, one group of webs acting to receive the material to be discharged into the container, said last mentioned group of webs raising the material to a central point adjacent the end of said container, the second group of webs acting to receive the material from said central point and discharge the same into the container, said groups of webs when operated in a reverse direction acting to receive material from the container and discharge the same at the point where the material had previously been received.

2. A device of the character described including a rotatable tubular container having an opening at one end, a housing surrounding one end of the container provided with an inlet hopper and a discharge section, a feeding structure which acts also as a discharge structure arranged in said housing, said feeding structure being connected rigidly to the container so as to be rotated thereby, said feeding structure having a series of spirally arranged webs presenting open-ended passageways, said webs being so arranged that when the spirals are rotated with the container the webs will pass through part of said discharge section and by the discharge opening in said hopper for collecting material discharged into the hopper and elevating the same, said webs acting to discharge the matter elevated thereby at a central point, and reversibly positioned series of webs formed to receive the matter discharged from the first set of webs and transmit said matter to the openings in said container, said webs acting in a reverse manner when rotated in a reverse direction, whereby matter discharged from the container will be moved into said discharge section.

3. In a device of the character described including a container for the collection of ash, garbage and other loose material, a hopper for receiving said material, said hopper having a discharge opening, a charge section adapted to receive the material from said hopper, and a spirally arranged feeding structure positioned to dip into said charge section and raise the material therefrom so that it will move by gravity into said container, and means for rotating said container and said spirally arranged feeding structure.

4. In a device of the character described, a container and means for feeding material into the container and removing the same therefrom, said means including a stationary casing having an inlet hopper and a discharge section, said hopper discharging into said discharge section, and a pair of rotatable spirally positioned webs, one set acting to scoop up material out of said discharge section and raise the same to a central point, and the other series of webs positioned to receive the material raised to the central point and direct the same into the container, and means for simultaneously rotating the container and said spirally positioned webs whereby they will all function simultaneously.

5. A device of the character described comprising a tubular rotating container having end members one of which is completely closed and the other provided with a plurality of apertures, means including a set of gearing for rotating said container, anti-friction means for supporting said container, said anti-friction means including substantially annular supporting members and a plurality of sets of anti-friction structures, each anti-friction structure comprising a pair of plates pivotally connected at the center to the annular supporting members, and a roller pivotally connected at each end of the supports whereby a slight rocking action is permitted to take care of any unevenness, and means for feeding material into the container as the container rotates.

6. A device of the character described including a tubular container, a pair of end members one of which is closed and the other provided with a plurality of openings, said container having a pair of radially extending flanges at the end having the openings, a pair of gaskets arranged between said flanges, a stationary housing having one of the walls extending between said gaskets and frictionally engaging the same, whereby a substantially airtight sliding connection is produced, said housing having a discharge section and an inlet section, both of said sections having doors fitting substantially tight enough to prevent undesirable odors from passing from the interior of the housing, and a pair of spirally arranged web structures arranged in the housing and connected to the container acting to move material from the feeding hopper into the container when moved in one direction, and to move the material from the container into the discharge section when moved in the opposite direction.

CHARLES J. SCHLUTER.